United States Patent [19]

Torimaru

[11] 4,218,915
[45] Aug. 26, 1980

[54] ELECTROMAGNETIC FLOWMETER

[75] Inventor: Takashi Torimaru, Musashino, Japan

[73] Assignee: Hokushin Electric Works, Ltd., Tokyo, Japan

[21] Appl. No.: 968,693

[22] Filed: Dec. 12, 1978

[30] Foreign Application Priority Data

Dec. 15, 1977 [JP] Japan .......................... 52-167630[U]

[51] Int. Cl.³ ................................................ G01F 1/60
[52] U.S. Cl. .................................................... 73/861.16
[58] Field of Search ....................................... 73/861.16

[56] References Cited

U.S. PATENT DOCUMENTS

| 3,902,366 | 9/1975 | Gruner | 73/194 EM |
| 3,943,765 | 3/1976 | Takada et al. | 73/194 EM |
| 3,996,797 | 12/1976 | Torimaru et al. | 73/194 EM |
| 4,059,014 | 11/1977 | Torimaru | 73/194 EM |

Primary Examiner—Charles A. Ruehl
Attorney, Agent, or Firm—Michael Ebert

[57] ABSTRACT

An electromagnetic flowmeter for measuring the flow rate of a fluid passing through a flow tube, the fluid intercepting a magnetic field established by an excitation coil supplied through an excitation circuit with a direct current or a current whose frequency is lower than that of a commercial AC power source. A DC reference voltage is derived from the excitation circuit which is either used in a feedback arrangement to maintain the excitation current constant or in a divider arrangement to correct for the adverse effects of fluctuations in the excitation current of the flow rate signal yielded by the flowmeter. The reference voltage is generated by means of an excitation-current detector that produces a voltage proportional to the excitation current, this voltage being applied to an isolation circuit that modulates the voltage to convert it into an AC voltage whose frequency is higher than the excitation frequency, the AC voltage being fed via a DC isolator into a demodulator which produces the desired DC reference voltage.

6 Claims, 6 Drawing Figures

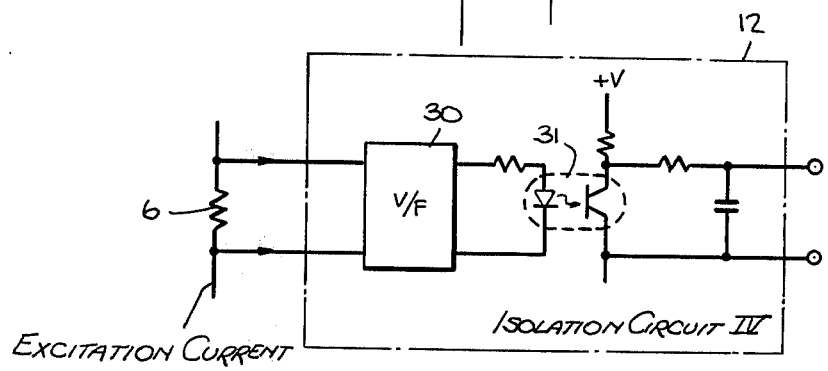
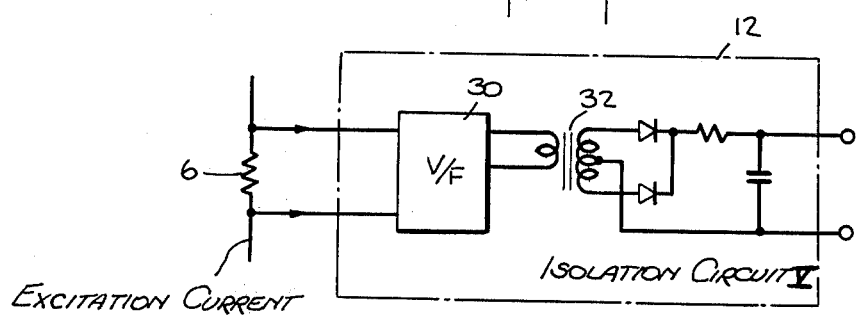
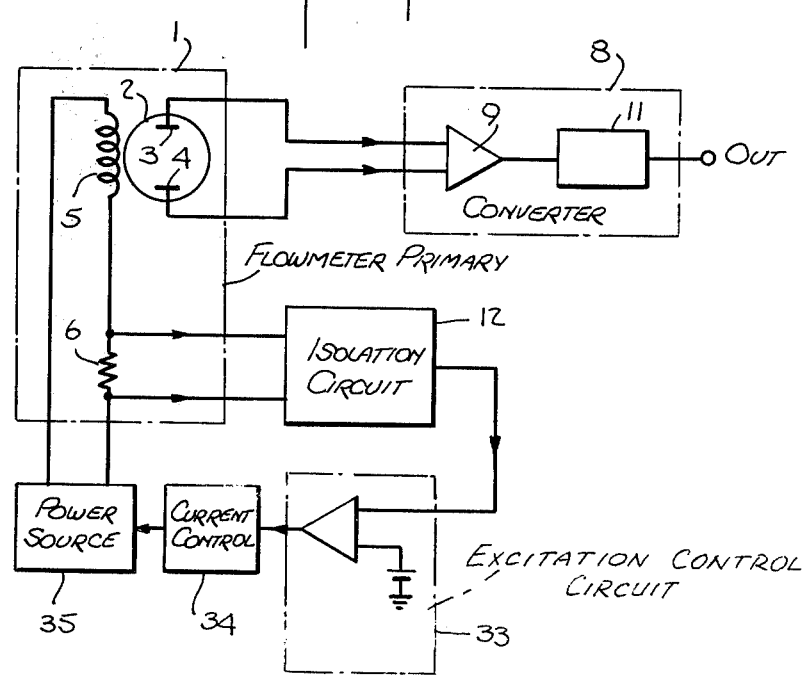

ELECTROMAGNETIC FLOWMETER

BACKGROUND OF THE INVENTION

This invention relates generally to an electromagnetic flowmeter system whose primary is excited by direct current or a current having a frequency lower than that of a standard commercial power source, and more particularly to a system in which a reference voltage proportional to the excitation current is detected in order to render the system insensitive to fluctuations in this current.

In recent years, magnetic flowmeters have been made available which make use of a low-frequency excitation wave in sinusoidal or rectangular form, such as one whose excitation frequency is well below that of the commercial power line frequency. One can, by means of a low-frequency excitation type magnetic flowmeter obtain a flow rate signal having an excellent signal-to-noise ratio; for unwanted magnetic coupling and/or electrostatic coupling between the excitation coil and the signal lead wires connected to the flow tube electrodes may thereby be reduced considerably.

A low-frequency excitation type magnetic flowmeter also requires an arrangement for eliminating fluctuations in the flow rate signal resulting from fluctuations in the excitation current for the electromagnet.

In order to eliminate unwanted fluctuations from the flow rate signal yielded by a magnetic flowmeter, the general practice is to provide a reference-voltage detecting circuit. This circuit is arranged to produce a reference-voltage proportional to the excitation current, the ratio of this reference-voltage to the flow rate signal being determined by means of a divider.

The reference-voltage is usually derived from the secondary winding of a reference-voltage detecting transformer whose primary winding is interposed in series with the excitation circuit of the electromagnet. This is done in order to isolate the divider from the excitation current. An isolation transformer arrangement for a reference voltage detection circuit in an electromagnetic flowmeter is disclosed in the Suzuki et al. U.S. Pat. No. 4,117,721 of Oct. 3, 1978.

In some prior art types of electromagnetic flowmeter systems in which the excitation-current frequency is well below 50 Hz or 60 Hz, the current transformer for deriving the reference voltage is very bulky as compared to those reqired when using a commercial power line frequency of 50 or 60 Hz for excitation. Without a bulky transformer for this purpose, one cannot obtain a reference voltage which is accurately proportional to the excitation current.

In one known form of a low-frequency excitation type electromagnetic flowmeter, the commercial power line source is isolated by a power transformer whose output voltage is applied to the excitation coil through an excitation-current detecting resistor to produce the reference voltage, the resistor thereby isolating the reference voltage from the commercial power line. The problem with this arrangement is that a power transformer of large capacity is required to handle a large excitation current, and the amount of heat radiated from this transformer is substantial. These factors militate against the reduction of the size and weight of the electromagnetic flowmeter.

SUMMARY OF INVENTION

In view of the foregoing, it is the main object of this invention to provide an electromagnetic flowmeter system including improved means to produce a reference voltage that is accurately proportional to the excitation current in order to eliminate the effect of fluctuations in the excitation current on the flow rate signal yielded by the system or to regulate the excitation power source to maintain the excitation current at a constant level.

Briefly stated, this object is accomplished in an electromagnetic flowmeter in accordance with the invention for measuring the flow rate of a fluid passing through a flow tube, the fluid intercepting a magnetic field established by an excitation coil supplied through an excitation circuit with a direct current or a current whose frequency is lower than that of a commercial power source.

A DC reference voltage is derived from the excitation circuit which is either used in a feedback arrangement to maintain the excitation current constant or in a divider arrangement to correct for the adverse effects of fluctuations in the excitation current of the flow rate signal yielded by the flowmeter. The reference voltage is generated by means of an excitation-current detector that produces a voltage proportional to the excitation current, this voltage being applied to an isolation circuit that modulates the voltage to convert it into an AC voltage whose frequency is higher than the excitation frequency, the AC voltage being fed via a DC isolator into a demodulator which produces the desired DC reference voltage.

OUTLINE OF DRAWINGS

For a better understanding of the invention as well as other objects and further features thereof, reference is made to the following detailed description to be read in conjunction with the accompanying drawings, wherein:

FIG. 4 is a schematic diagram of a fourth version of this circuit;

FIG. 5 is a schematic diagram of a fifth version of this circuit; and

FIG. 6 is a schematic diagram of a second preferred embodiment of the flowmeter system.

DESCRIPTION OF INVENTION

First Embodiment

Figure 1:
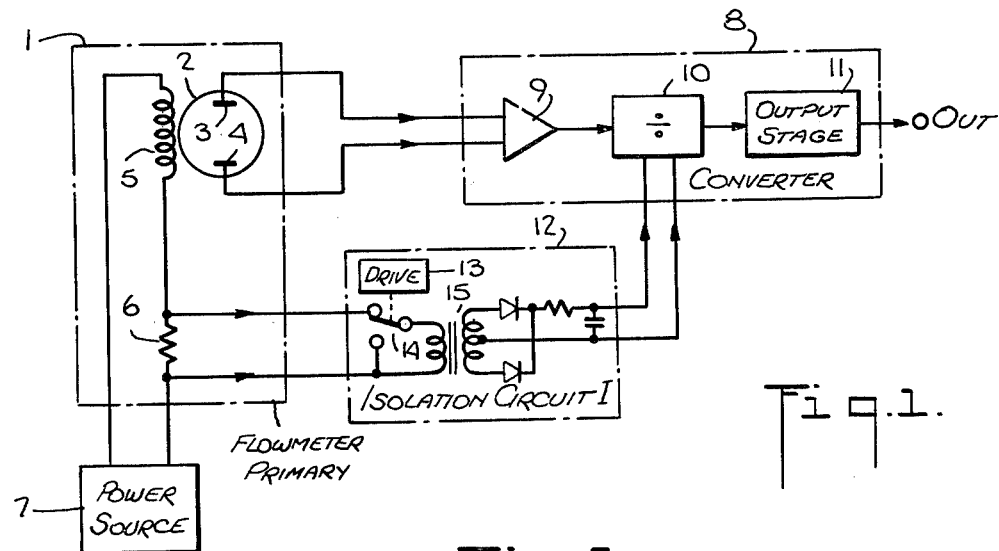
FIG. 1 is a schematic diagram of a first preferred embodiment of an electromagnetic flowmeter system having a first version of a reference-voltage isolation circuit in accordance with the invention.

Referring now to FIG. 1, there is shown a low-frequency excitation type electromagnetic flowmeter system having a reference-voltage detecting circuit in accordance with this invention. In this figure, dotted-line block 1 encloses a conventional electromagnetic flowmeter primary. The fluid whose flow rate is to be metered is conducted through a flow tube 2 having a pair of electrodes 3 and 4 disposed at diametrically opposed positions thereon.

An excitation coil 5 acts to establish a magnetic field within the flow tube whose lines of flux are perpendicular both to the transverse axis passing through electrodes 3 and 4 and the longitudinal axis of tube 2. A signal whose voltage is proportional to volumetric flow rate is induced across electrodes 3 and 4, the induced signal being applied to a converter whose components are contained in dotted-line block 8.

Converter 8 comprises a pre-amplifier 9 acting to amplify the flow rate signal to some fixed level and a divider 10 functioning to divide the output signal from pre-amplifier 9 by a reference voltage proportional to the excitation current, thereby eliminating fluctuations from the flow rate signal resulting from fluctuations in the excitation current. The output of divider 10 is fed to an output stage 11.

In this arrangement, the output of an excitation power source 7 is connected serially through an excitation current-detecting resistor 6 to excitation coil 5. The voltage developed across resistor 6 in this excitation circuit is applied to an isolation circuit (I), generally designated by numeral 12. The reference voltage yielded in the output of isolation circuit 12 is applied to divider 10.

The operation of this system is as follows: Power source 7 produces a direct current or a low-frequency rectangular or sinusoidal wave which is applied to excitation coil 5 to produce an excitation current therein which flows through resistor 6 to develop thereacross a voltage proportional thereto. This voltage is applied to the input of isolation circuit 12 which includes a chopper switch 14 periodically actuated at a high rate by a drive circuit 13.

Switch 14 modulates the voltage fed to the primary of an isolation transformer 15 whereby an AC voltage is yielded by the secondary of transformer 15. This AC voltage is rectified and filtered to produce the desired DC reference voltage which is applied to divider 10.

In divider 10, the flow-induced signal from the output of pre-amplifier 9 is divided by the reference voltage to produce a flow rate signal accurately indicative of the flow rate of the fluid being metered, this signal being independent of fluctuations in the excitation current. The flow rate signal is amplified or converted in output stage 11 to a corresponding current signal which appears at output terminal OUT.

The present invention therefore makes it possible to isolate the DC reference voltage from the excitation power source by means of an isolation circuit 12 having a simple structure. The size required of isolation transformer 15 depends on the operating rate of chopper switch 14. This size can be reduced by raising the frequency of drive circuit 13 which actuates this switch.

One can decrease the ohmic value of the excitation detecting resistor 6 and thereby reduce the radiant heat emitted by this resistor. Since this reduction in resistance results in a decreased voltage thereacross, this decrease is compensated for by increasing the transformer step-up ratio of isolation circuit 12.

ISOLATION CIRCUIT II

Figure 2:
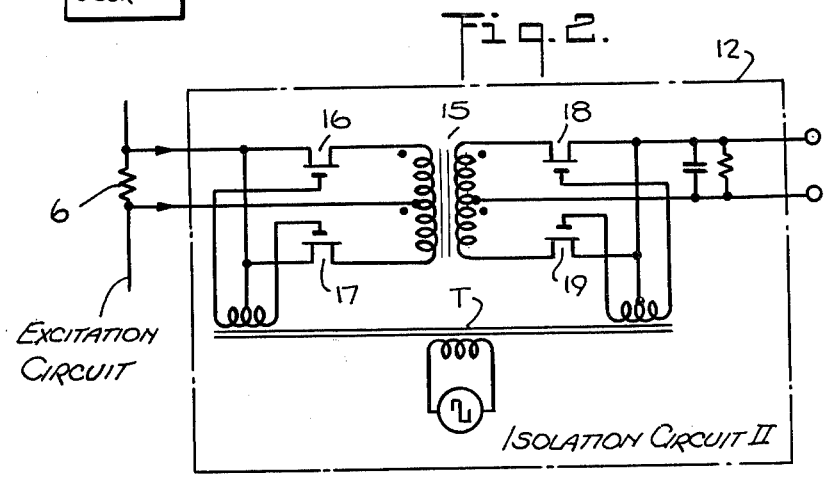
FIG. 2 is a schematic diagram of a second version of the isolation circuit.

In FIG. 2, there is shown a modified form of isolation circuit 12 for use in a flowmeter system of the type embodied in FIG. 1. In this circuit, the voltage developed across the excitation-current detecting resistor 6 is converted by means of a pair of field effect transistors 16 and 17 which are alternately driven, as a consequence of which the voltage applied thereby to the primary of transformer 15 is modulated at a frequency which is high relative to the excitation frequency to provide the required AC voltage.

The AC voltage yielded by the secondary of transformer 15 is demodulated by a second pair of alternately-operated field effect transistors 18 and 19 to provide the desired DC reference voltage. The alternate operation of the field effect transistor pairs 16–17 and 18–19 is effected by a transformer T having two secondaries, each associated with a respective pair of transistors.

Isolation Circuit III

Figure 3:
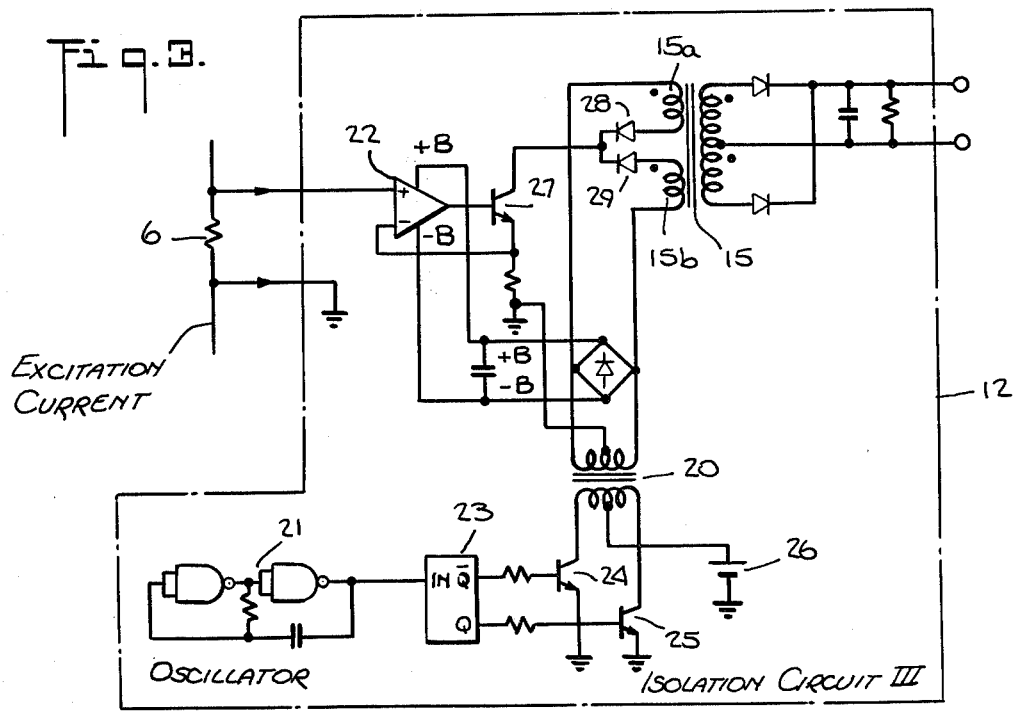
FIG. 3 is a schematic diagram of a third version of this circuit.

Referring now to FIG. 3, there is shown a third version of an isolation circuit 12 for use in the flowmeter system of the type shown in FIG. 1. In this arrangement, the output of an oscillator 21 is applied to a flip-flop 23 whose Q and Q̄ outputs are respectively applied to transistors 24 and 25 to render these transistors alternately conductive.

These transistors act to periodically apply DC power from a DC power source 26 to the primary of an oscillator transformer 20 whose secondary yields an AC voltage.

The voltage developed across excitation-current detecting resistor 6 is converted by an operational amplifier 22 and a transistor 27 to a corresponding current. The current flowing through transistor 27 is supplied from the center tap of the secondary of oscillator transformer 20 via primary windings 15a and 15b of isolation transformer 15 through diodes 28 and 29, respectively. But in this instance, current flows in either one of primaries 15a and 15b of isolation transformer 15 in accordance with the polarity of the voltage yielded by the secondary of oscillator transformer 20.

As a result, a current proportional to the voltage developed across excitation-current detecting resistor 6 is supplied to one of primary windings 15a and 15b of isolation transformer 15 while it is being modulated into an AC current of the same frequency as the AC voltage induced in the secondary winding of oscillator transformer 20. The resultant modulated AC voltage yielded by the secondary of isolation transformer 15 is rectified and filtered to provide the desired DC reference voltage.

Isolation Circuit IV

Still another example of an isolation circuit is illustrated in FIG. 4, where the voltage developed across the excitation-current detecting resistor 6 is applied to a voltage-to-frequency (V/F) converter 30 which may be a chopper as in FIG. 1 or a transistorized modulator as in FIG. 2 whose output signal is fed to the light-emitting diode input of a photo-coupler 31 whose phototransistor provides a demodulated output which is filtered to yield the desired DC reference voltage.

In this arrangement, the DC reference voltage is isolated by photo-coupler 31 from the excitation power source 7.

Isolation Circuit V

In FIG. 5, yet another version of an isolation circuit 12 is illustrated. In this instance, the voltage developed across resistor 6 is again applied to a voltage-to-frequency converter 30. But the output of this converter is applied to a rectifier through a pulse transformer 32 to provide a DC reference voltage which is isolated by the pulse transformer from the excitation power source.

Second Embodiment

The invention is also applicable to an electromagnetic flowmeter system of the type shown in FIG. 6 in which the excitation current detected by resistor 6 in the excitation circuit produces a reference voltage which is fed back to maintain the excitation current at a constant level.

To this end, an excitation control circuit 33 is provided to which is applied as a feedback signal the reference voltage obtained from the output of isolation circuit 12 whose input is coupled to resistor 6. The output of excitation control circuit 33 is fed through a second isolation circuit 34 to an excitation power source 35 in a manner whereby fluctuations in the excitation current supplied by the power source are cancelled out to maintain this current at a constant level.

To maintain constant the excitation current, one preferably employs for this purpose a power transistor in excitation power source 35 which is arranged to directly regulate the excitation current. However, the excitation control circuit for operating the power transistor is preferably an integrated circuit and must, therefore, for reasons of safety, be isolated from the commercial power source. This power transistor may be amplitude or duty-cycle controlled. The signal transmission accuracy requirements of the second isolation circuit 34 are not as stringent as those of isolation circuit 12.

While there have been shown and described preferred embodiments of an electromagnetic flowmeter in accordance with the invention, it will be appreciated that many changes and modifications may be made therein without, however, departing from the essential spirit thereof.

I claim:

1. In an electromagnetic flowmeter adapted to measure the flow rate of fluid which passes through a flow tube to intercept a magnetic field established by an excitation coil supplied through an excitation circuit with a direct current or a current whose frequency is lower than that of a commercial AC power source, thereby inducing a signal indicative of flow rate in a pair of electrodes mounted in the tube; a circuit arrangement to derive from the excitation circuit a DC reference voltage to be used either to maintain the excitation current constant to render said signal independent of fluctuations in said excitation current or to correct for the adverse effect of excitation current fluctuations on the flow rate signal, said arrangement comprising:

A an excitation-current detector coupled to the excitation circuit to produce a detection voltage proportional to the excitation current; and B an isolation circuit coupled to said detector, said circuit including means to modulate the detection voltage at a frequency higher than said excitation current frequency to convert it to a high-frequency AC voltage, a DC isolator, a demodulator and means to feed said AC voltage through said DC isolator to said demodulator to produce said DC reference voltage.

2. An arrangement as set forth in claim 1, wherein said excitation-current detector is constituted by a resistor in series with said power source.

3. An arrangement as set forth in claim 1, wherein said modulation means is constituted by a chopper switch to convert said detection voltage to an AC voltage.

4. An arrangement as set forth in claim 3, wherein said DC isolator is a transformer interposed between said chopper switch and said demodulator.

5. An arrangement as set forth in claim 1, wherein said modulation means is constituted by a pair of alternately-operated transistors to convert said detection voltage to an AC voltage.

6. An arrangement as set forth in claim 1, wherein said demodulator and said DC isolator are constituted by a photocoupler having a light-emitting diode responsive to said high-frequency AC voltage to produce periodic light pulses that are picked up by a photo transistor electrically-isolated from the diode, the photo transistor functioning as a demodulator to produce said DC reference voltage.

* * * * *